United States Patent [19]

Matsumura et al.

[11] Patent Number: 4,778,264
[45] Date of Patent: Oct. 18, 1988

[54] REFRACTION-TYPE PROJECTION LENS

[75] Inventors: Takeshi Matsumura; Yoshiaki Himeno, both of Saitama, Japan

[73] Assignee: Fuji Photo Optical Co., Ltd., Saitama, Japan

[21] Appl. No.: 917,370

[22] Filed: Oct. 7, 1986

[30] Foreign Application Priority Data

Oct. 9, 1985 [JP] Japan ................. 60-225665

[51] Int. Cl.[4] .............. G02B 13/18; G02B 3/02; G02B 9/60
[52] U.S. Cl. ................. 350/432; 350/412; 350/465
[58] Field of Search ............ 350/432, 412, 465

[56] References Cited

U.S. PATENT DOCUMENTS

| 3,429,997 | 2/1969 | Rösner et al. | 350/412 X |
|---|---|---|---|
| 3,800,085 | 3/1974 | Ambats et al. | 350/432 |
| 3,868,173 | 2/1975 | Miles et al. | 350/432 X |
| 4,564,269 | 1/1986 | Vehara | 350/432 |
| 4,577,935 | 3/1986 | Yamakawa et al. | 350/432 |
| 4,620,773 | 11/1986 | Fukuda | 350/432 |
| 4,666,261 | 5/1987 | Arai | 350/432 |
| 4,682,862 | 7/1987 | Moskovich | 350/412 |
| 4,685,774 | 8/1987 | Moskovich | 350/412 |
| 4,697,892 | 10/1987 | Betensky | 350/412 |

FOREIGN PATENT DOCUMENTS

| 58-125007 | 7/1983 | Japan . | |
|---|---|---|---|
| 0139111 | 8/1983 | Japan | 350/465 |
| 59-121016 | 7/1984 | Japan . | |
| 59-155818 | 9/1984 | Japan . | |

Primary Examiner—John K. Corbin
Assistant Examiner—Ronald M. Kachmarik
Attorney, Agent, or Firm—Young & Thompson

[57] ABSTRACT

A projection lens for projecting an image appearing on a CRT onto a large-sized screen, comprising, from the screen side a first lens structure including a meniscus lens having both surfaces convex toward the screen, a second lens structure comprising a cemented glass lens, a single glass lens and a plastic aspherical lens, and third lens structure of negative power with one concave surface toward the screen. Locating the aspherical surface on the plastic lens, and providing most of the lens power with the glass lenses, achieves low cost of manufacture, light weight, little chromatic aberration, and little change of focal length with change of temperature.

12 Claims, 3 Drawing Sheets

— GREEN (546.1 nm)
---- BLUE (445.0 nm)
—·— RED (615.0 nm)

Fno 1.3
APERTURE

REFRACTION-TYPE PROJECTION LENS

BACKGROUND OF THE INVENTION

The present invention relates to a projection lens, more particularly to refraction-type projection lenses for projecting a magnified image appearing on the cathode ray tube of a projection television system onto a separate large screen.

Projection television systems are usually provided with three monochromatic color projection tubes or CRTs for blue, green and red, each being equipped with a projection lens for projecting a monochromatic image on the CRT onto a screen so as to compose three monochromatic images, thereby displaying a magnified color image on the screen. Because of the narrow band widths of luminous spectra of the fluorescent substances contained in the fluorescent screens of the CRTs, it is less necessary for the CRTs, in particular for general or personal use, to be equipped with such projection lenses including a chromatic aberration correction lens.

Recent projection television systems, however, tend to be equipped with a high resolution projection lens. In addition to this trend, there is now attempted to project images appearing on three monochromatic color CRTs having a broader wave length range in each CRT's fluorescent layer for the purpose of obtaining more brightness on the screen and for the purpose of low manufacturing cost. For these purposes, the projection lens is unavoidably required to be able also to correct the chromatic aberrations.

On the other hand, a high resolution projection lens has the serious problem that the projection lens undergoes a change in focal length with a change of temperature, which impairs image quality. In view of the above, the conventional plastic projection lenses do not perform well as to chromatic aberration corrections and the change of focal length due to temperature changes.

Glass projection lenses, of which all the component lenses are made of glass materials, are more advantageous in regard to the above-mentioned problems. But it is difficult to produce aspherical optical surfaces on glass lenses, glass projection lenses always comprise at least seven to ten lens elements of spherical surface, resulting in undesirable manufacturing cost or selling price and heavy weight. Accordingly, there has been a strong demand in this field to develop a novel projection lens for use with high quality projection television systems which is able to solve the above problems and to satisfy the requirements of low price and light weight.

Responding to this demand, high resolution projection lenses have been developed by making use of conventional plastic lens technology in the production of projection lenses for use with high quality projection television systems. The key point is to use a plastic aspherical surface in the projection lens for the purpose of reducing aberrations of a monochromatic nature, with a decreased number of component lenses and light weight.

A plastic projection lens wherein all the component lenses are made of plastic materials, however, has the problem that it is hard to correct sufficiently the chromatic aberrations because of the limited varieties of available plastic materials for high quality lenses. In addition to this problem, there is the difficulty that plastic lenses are unable to serve as the principal elements of the projection lens because plastic materials have a large refraction index change with temperature and a high linear thermal expansion coefficient in comparison with glass materials as is shown, by example, in Table I, and there is no plastic lens whose shift of focal length with temperature falls within the permissible limits.

TABLE I

|  | Refractive Index Change with Temperature | Linear Thermal Expansion Coefficient |
| --- | --- | --- |
| Acrylic Resin | $-1.1 \times 10^{-4}/°C.$ | $7.5 \times 10^{-5}/°C.$ |
| Glass (BK7) | $1.7 \times 10^{-6}/°C.$ | $7.1 \times 10^{-6}/°C.$ |

For these reasons, it is necessry to use some glass elements along with plastic elements in a projection lens for suitable correction of chromatic aberrations and for keeping the shift of focal length with temperature within the permissible limits.

OBJECT OF THE INVENTION

It is therefore an object of the present invention to provide a hybrid-type projection lens for use with projection television systems which comprises glass and plastic lenses combined as a basic lens system.

SUMMARY OF THE INVENTION

The present invention provides a refraction-type projection lens for use with a projection television system of the type including three monochromatic projection tubes or CRTs, which comprises three lens means, namely first, second and third from the screen side. The first means comprises a single element which is a meniscus lens having its convex surface toward the screen. The second means comprises three elements, namely, a cemented glass lens, a single glass lens and a single plastic lens having at least one aspherical surface. The third means comprises a single element of negative power having one concave surface toward the screen. The element of the first means is so shaped not only to limit the generation of sagittal flare to the utmost and to make up the curvature of the sagittal image surface which cannot be corrected by the third means, but also to ensure a large aperture and a wide angle of view. The second means is adapted to correct chromatic aberration by use of the cemented glass, to limit the change of focal length of the projection lens due to temperature changes to the utmost by letting the single glass lens provide the greatest part of the projection lens, and to correct the aberrations which spherical surfaced glass lenses generate by use of the plastic aspherical lens. The single element of the third means is a field-flattener having a negative power for compensating Petzval curvature generated by the positive elements of the lens system.

According to the above-described arrangement, which has not been used in any conventional projection lenses, a high resolution, refraction-type projection lens can be provided.

The invention, and its advantages, will become more apparent from the detailed description of a preferred embodiment presented below.

BRIEF DESCRIPTION OF THE DRAWINGS

The present invention will be described with reference to the accompanying drawings, wherein.

DETAILED DESCRIPTION OF THE INVENTION

Figure 1:
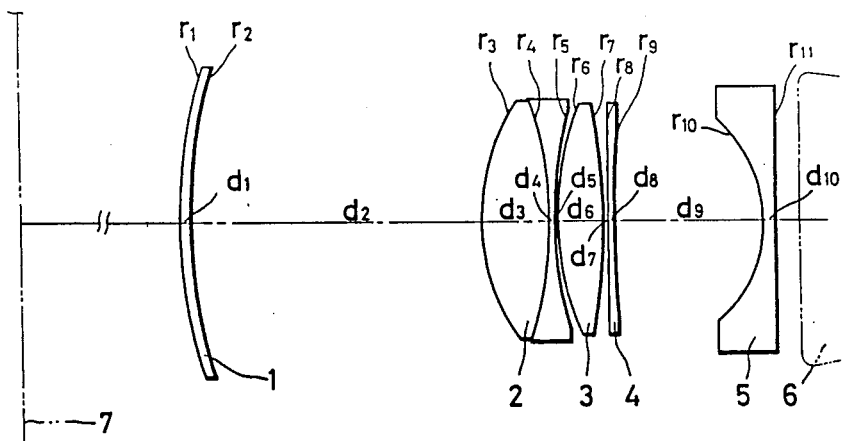
FIG. 1 is a side elevational view of a projection lens of the present invention.

As shown in FIG. 1, the projection lens according to the present invention, which comprises three lens means, is arranged in front of a CRT 6 so as to magnify and project an image appearing on the CRT 6 onto a large screen 7 (shown by a dotted line) far from the projection lens. In practice, three arrangements of the projection lens and CRT for three monochromatic images, namely blue, green and red, are installed in a projection television system. The three monochromatic images projected are composed on the screen 7 to display a magnified color image.

The projection lens includes, in this embodiment, five elements comprising from the screen side a meniscus lens 1 having convex surfaces relative to the screen 7, a cemented glass lens 2, a single glass lens 3, a single plastic lens 4 having at least one aspherical surface, and a single lens 5 of negative power having a concave surface relative to the screen 7. In Tables II and III, there are given, by way of example, the detailed data of the projection lens of FIG. 1.

In each instance described hereinafter, reference characters $r_1, r_2, \ldots,$ and $r_{11}$ represent the paraxial radii (mm) of curvature of the respective lens surface $d_1, d_2, \ldots,$ and $d_{10}$ represent the thickness (mm) of the respective lenses or the axial distances (mm) between opposite surfaces, $n_1, n_2, \ldots,$ and $n_6$ represent the refractive indices of the respective lenses, and $\nu_1, \nu_2, \ldots,$ and $\nu_6$, represent Abbe-numbers of the respective lenses. Fno., f and $2\omega$ indicate the F-number, the focal length (mm) and the angle of view. The shape of each aspherical surface is given by the following equation:

$$Z = a_1 y^2 + a_2 y^4 + a_3 y^6 + a_4 y^8 + a_5 y^{10}$$

where

Z: the surface sag at a semi-aperture distance y (mm) from the optical axis (Z axis) of the lens, the origin being the point of intersection of the lens surface and the optical axis.

$a_1, a_2, \ldots, a_5$: aspherical coefficient.

EXAMPLE

TABLE II

A lens shown in FIG. 1
Fno = 1.3, f = 100 mm, $2\omega = 54°$

| | | | | | | | |
|---|---|---|---|---|---|---|---|
| $r_1$ | 145.89 | | | | | | |
| | | $d_1$ | 3.50 | $n_1$ | 1.492 | $\nu_1$ | 57.2 |
| $r_2$ | 177.10 | | | | | | |
| | | $d_2$ | 107.65 | | | | |
| $r_3$ | 71.54 | | | | | | |
| | | $d_3$ | 25.00 | $n_2$ | 1.623 | $\nu_2$ | 60.3 |
| $r_4$ | −143.81 | | | | | | |
| | | $d_4$ | 2.50 | $n_3$ | 1.678 | $\nu_3$ | 32.2 |

TABLE II-continued

A lens shown in FIG. 1
Fno = 1.3, f = 100 mm, $2\omega = 54°$

| | | | | | | | |
|---|---|---|---|---|---|---|---|
| $r_5$ | 139.41 | | | | | | |
| | | $d_5$ | 0.80 | | | | |
| $r_6$ | 92.67 | | | | | | |
| | | $d_6$ | 16.50 | $n_4$ | 1.518 | $\nu_4$ | 64.0 |
| $r_7$ | −257.11 | | | | | | |
| | | $d_7$ | 2.00 | | | | |
| $r_8$ | ∞ | | | | | | |
| | | $d_8$ | 2.50 | $n_5$ | 1.492 | $\nu_5$ | 57.2 |
| $r_9$ | −963.18 | | | | | | |
| | | $d_9$ | 54.65 | | | | |
| $r_{10}$ | −50.31 | | | | | | |
| | | $d_{10}$ | 4.00 (mm) | $n_6$ | 1.492 | $\nu_6$ | 57.2 |
| $r_{11}$ | ∞ (mm) | | | | | | |

ASPHERICAL COEFFICIENTS

TABLE III

| | $r_1$ | $r_9$ | $r_{10}$ |
|---|---|---|---|
| $a_1$ | $3.4273 \times 10^{-3}$ | $-5.1911 \times 10^{-4}$ | $-9.9394 \times 10^{-3}$ |
| $a_2$ | $-8.6020 \times 10^{-8}$ | $8.5020 \times 10^{-7}$ | $-2.3211 \times 10^{-6}$ |
| $a_3$ | $-1.6183 \times 10^{-11}$ | $1.0470 \times 10^{-11}$ | $4.9388 \times 10^{-10}$ |
| $a_4$ | $-9.0629 \times 10^{-16}$ | $7.0244 \times 10^{-14}$ | $-3.4879 \times 10^{-13}$ |
| $a_5$ | $-1.4306 \times 10^{-19}$ | $-1.3909 \times 10^{-17}$ | $-1.1994 \times 10^{-16}$ |

Designating the lens power (equal to the reciprocal of the focal length f) of each lens group of the projection lens defined above as $\phi_1$ (or $1/f_1$), $\phi_2$ (or $1/f_2$) and $\phi_3$ (or $1/f_3$) for the first, second and third lens means, respectively, the lens power of each lens means relative to the total lens power $\phi$ of the overall projection lens of the above example is as follows:

$$\phi_1/\phi = 0.061, \phi_2/\phi = 1.083, \text{ and } \phi_3/\phi = -0.975.$$

As is apparent from the above, the second lens group has the strongest power of the three.

In the same manner as in the overall projection lens, designating the lens power of each lens of the second means as $\phi_{22}, \phi_{23}, \phi_{24}$ for the second, third and fourth lenses 2, 3, 4, the total power $\phi_2$ of the second lens means is as follows:

$$\phi_{22}/\phi_2 = 0.389, \phi_{23}/\phi_2 = 0.689, \text{ and } \phi_{24}/\phi_2 = 0.047.$$

This arrangement of the lenses of the second means, by which the present invention is characterized, apportions a relatively strong power to the first element nearest to the screen, namely the cemented lens for the correction of longitudinal and transverse chromatic aberrations and the strongest power to the second element or the single lens 3 disposed opposite to the screen relative to and next to the relatively strong power lens. This power apportionment and the use of glass materials for both of the first and second lenses ensures that the projection lens will change in focal length due to temperature changes only within the permissible limits.

Figure 2:
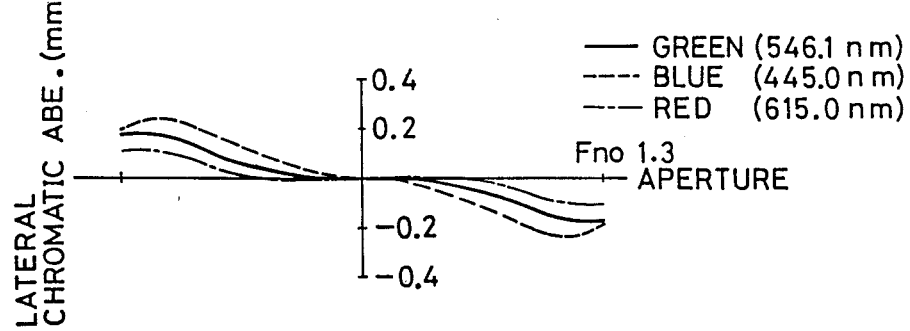
FIG. 2 is a graph showing longitudinal chromatic aberrations of the projection lens of FIG. 1.

FIG. 2 shows the lateral chromatic aberrations for the respective colors in the direction perpendicular to the optical axis of a projection lens characterized by the above-tabulated data. There are shown in FIG. 2 the aperture on the abscissa and the lateral chromatic aberration in the direction perpendicular to the optical axis on the ordinate. The lateral chromatic aberrations are depicted by a solid line, a dashed line and a dotted line for green light of the wavelength 536.1 nm, blue light of the wavelength 443.0 nm and red light of the wavelength 614.0 nm, respectively. The lateral chromatic aberration of each color is, as is evident from FIG. 2, considerably corrected and the maximum value can be notionally given as being a circle of confusion having a diameter of 0.48 nm.

Figure 3:
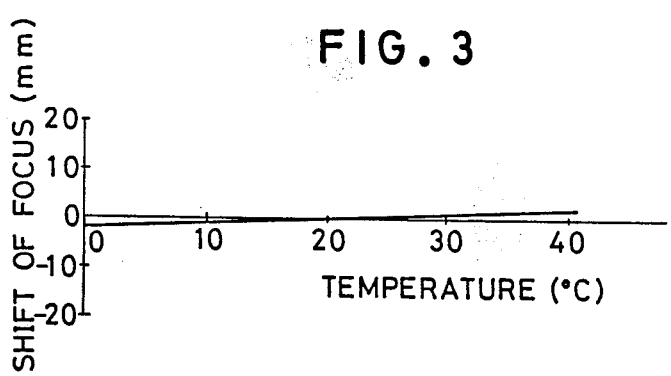
FIG. 3 is a graph showing how the projection lens of FIG. 1 shifts its focus on the screen according to temperature changes.

Referring to FIG. 3 showing the shift of focal length of the projection lens of FIG. 1 with temperature changes as the calculated result on the basis of the above-tabulated data, there are shown the temperature in Centigrade on the abscissa and the change of focus on the screen on the ordinate. It is to be noted that the shift of focus at 20° C. is taken as the standard in FIG. 2.

Figure 4:
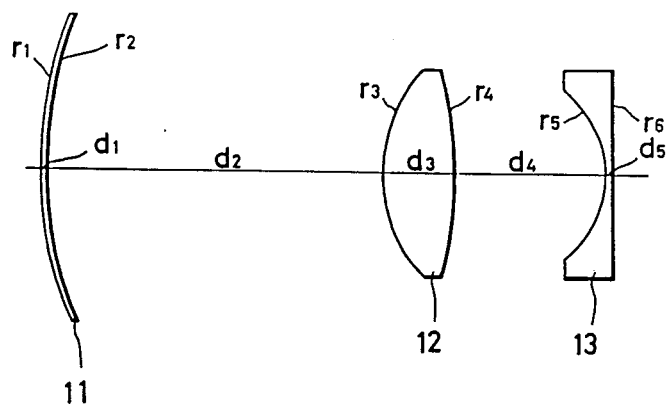
FIG. 4 is a side elevational view of an example of a conventional projection lens.

To emphasize the distinctive features of the present invention, the conventional projection lens disclosed in Japanese Patent Application. No. 59-66270 will be, by way of example, described hereunder for comparison with the above-described projection lens, with reference to FIGS. 4 to 6. FIG. 4 shows this conventional projection lens in which all the component lenses are made of plastic materials and which comprises three means 11, 12, 13, each means comprising a single lens. In Tables IV and V, there are given the detailed data of the projection lens of FIG. 4 in the same way as in Tables II and III.

CONVENTIONAL PROJECTION LENS
TABLE IV

A lens shown in FIG. 4
Fno = 1.1, f = 100 mm, 2ω = 54°

| | | | | | |
|---|---|---|---|---|---|
| $r_1$ | 155.38 | | | | |
| | | $d_1$ | 2.7 | | $n_1 = 1.492$ |
| $r_2$ | 185.45 | | | | |
| | | $d_2$ | 138.9 | | |
| $r_3$ | 62.41 | | | | |
| | | $d_3$ | 30.9 | | $n_2 = 1.492$ |
| $r_4$ | −146.18 | | | | |
| | | $d_4$ | 69.4 | | |
| $r_5$ | −58.83 | | | | |
| | | $d_5$ | 3.0 (mm) | | $n_3 = 1.492$ |
| $r_6$ | ∞ (mm) | | | | |

ASPHERICAL COEFFICIENTS
TABLE V

| | $r_1$ | $r_3$ | $r_4$ | $r_5$ |
|---|---|---|---|---|
| $a_1$ | $3.1294 \times 10^{-3}$ | $8.0546 \times 10^{-3}$ | $-3.5391 \times 10^{-3}$ | $-8.4433 \times 10^{-3}$ |
| $a_2$ | $-3.1679 \times 10^{-8}$ | $1.6085 \times 10^{-7}$ | $4.0781 \times 10^{-7}$ | $-4.1541 \times 10^{-0}$ |
| $a_3$ | $-1.8220 \times 10^{-11}$ | $4.2009 \times 10^{-11}$ | $-2.7097 \times 10^{-11}$ | $7.9261 \times 10^{-10}$ |
| $a_4$ | $2.0329 \times 10^{-15}$ | $-2.3208 \times 10^{-14}$ | $-1.3936 \times 10^{-14}$ | $6.9213 \times 10^{-13}$ |
| $a_5$ | $9.9295 \times 10^{-20}$ | $7.2981 \times 10^{-18}$ | $5.9022 \times 10^{-18}$ | $8.1224 \times 10^{-16}$ |

Figure 5:
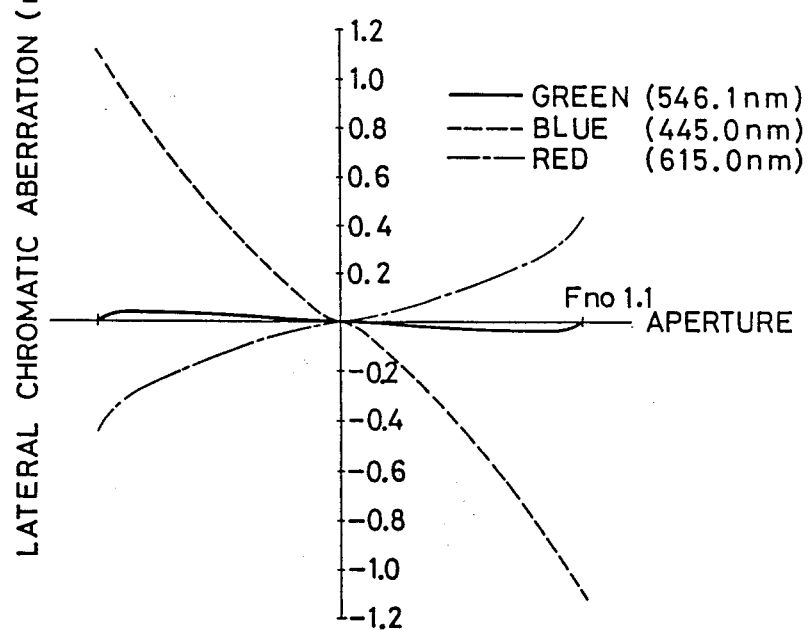
FIG. 5 is a graph similar to FIG. 2 showing longitudinal chromatic aberrations of the conventional projection lens of FIG. 4.

FIG. 5, which is similar to FIG. 2, shows the lateral chromatic aberrations calculated from the data in Tables IV and V. It is apparent from the comparison of the lateral chromatic aberration between the projection lenses of FIG. 1 and of FIG. 4 that the lateral chromatic aberration has been reduced by the present invention to about one-fifth that of the prior art. Therefore, it can be said that the projection lens of FIG. 1 has considerably corrected lateral chromatic aberration.

Figure 6:
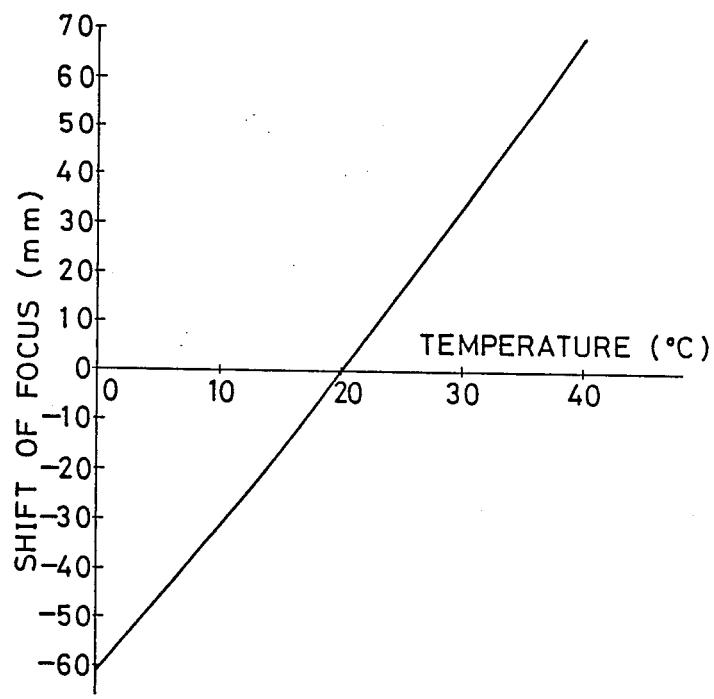
FIG. 6 is a graph similar to FIG. 3 showing how the conventional projection lens of FIG. 4 shifts its focus on the screen according to temperature changes.

FIG. 6, which is similar to FIG. 3, shows how the projection lens changes in focal length with temperature change. It will also be apparent from a comparison of FIGS. 3 and 6 that the shift of focus has been considerably decreased by the present invention, specifically to be only about 1/30 that of the prior art.

Although the present invention has been described by way of a preferred embodiment thereof with reference to the accompanying drawings, it is to be understood that the possibility of making various changes and modifications will be apparent to those skilled in the art. Therefore, unless otherwise such changes and modifications depart from the true scope of the present invention, they should be construed as being included therein.

What is claimed is:

1. A projection lens for projecting an image on a screen, comprising from the screen side a first lens means comprising at least a meniscus element with both surfaces convex relative to the screen, a second lens means comprising a cemented glass lens, a single glass lens separate from said cemented glass lens and a plastic aspherical lens, said single glass lens being disposed between said cemented glass lens and said plastic aspherical lens, said single glass lens and said plastic aspherical lens having confronting surfaces of which that of said single glass lens is of lesser radius than that of said plastic aspherical lens, and a third lens means of negative power with one concave surface toward the screen.

2. A projection lens as defined in claim 1, wherein said second lens means has the highest lens power of the three said lens means.

3. A projection lens as defined in claim 1, wherein said single glass lens has the highest lens power of the three lenses of said second lens means.

4. A projection lens as defined in claim 1, wherein said first lens means comprises a single plastic meniscus lens.

5. A projection lens as claimed in claim 1, wherein said first lens means comprises a meniscus lens with one aspherical surface.

6. A projection lens as claimed in claim 1, wherein said third lens means comprises a field-flattener lens with one aspherical surface.

7. A projection lens as defined in claim 5, wherein said meniscus lens is made of plastic.

8. A projection lens as defined in claim 6, wherein said field-flattener lens is made of plastic.

9. A projection lens as defined in claim 1, wherein said plasti caspherical lens has an aspherical surface defined by the following equation:

$$Z = a_1y^2 + a_2y^4 + a_3y^6 + a_4y^8 + a_5y^{10}$$

where

Z: the surface sag at a semi-aperture distance y (mm) from the optical axis (Z axis) of the lens, the origin being the point of intersection of the lens surface and the optical axis, $a_1, a_2, \ldots, a_5$: aspherical coefficient.

10. A projection lens as defined in claim 1, wherein both exposed surfaces of said cemented glass lens are aspherical and both exposed surfaces of said single glass lens are spherical.

11. A projection lens as defined in claim 1, wherein one surface of said plastic aspherical lens is flat.

12. A projection lens for projecting an image on a screen, comprising from the screen side a first lens means comprising at least a meniscus aspherical lens with both surfaces convex relative to the screen, a second lens means comprising a cemented glass lens, a single glass lens and a plastic aspherical lens, and a third lens means of negative power which is an aspherical lens with one concave surface toward the screen, wherein said aspherical lenses have aspherical surfaces each of which is defined by the following equation:

$$Z = a_1 y^2 + a_2 y^4 + a_3 y^6 + a_4 y^8 + a_5 y^{10}$$

where

Z: the surface sag at a semi-aperture distance y (mm) from the optical axis (Z axis) of the lens, the origin being the point of intersection of the lens surface and the optical axis, $a_1, a_2, \ldots a_5$: aspherical coefficient, and said respective lenses have the following values:

| | | | | | | | | |
|---|---|---|---|---|---|---|---|---|
| $r_1$ | 145.89 | | | | | | | |
| | | $d_1$ | 3.50 | | $n_1$ | 1.492 | $\nu_1$ | 57.2 |
| $r_2$ | 177.10 | | | | | | | |
| | | $d_2$ | 107.65 | | | | | |
| $r_3$ | 71.54 | | | | | | | |
| | | $d_3$ | 25.00 | | $n_2$ | 1.623 | $\nu_2$ | 60.3 |
| $r_4$ | −143.81 | | | | | | | |
| | | $d_4$ | 2.50 | | $n_3$ | 1.678 | $\nu_3$ | 32.2 |
| $r_5$ | 139.41 | | | | | | | |
| | | $d_5$ | 0.80 | | | | | |
| $r_6$ | 92.67 | | | | | | | |
| | | $d_6$ | 16.50 | | $n_4$ | 1.518 | $\nu_4$ | 64.0 |
| $r_7$ | −257.11 | | | | | | | |
| | | $d_7$ | 2.00 | | | | | |
| $r_8$ | ∞ | | | | | | | |
| | | $d_8$ | 2.50 | | $n_5$ | 1.492 | $\nu_5$ | 57.2 |
| $r_9$ | −963.18 | | | | | | | |
| | | $d_9$ | 54.65 | | | | | |
| $r_{10}$ | −50.31 | | | | | | | |
| | | $d_{10}$ | 4.00 (mm) | | $n_6$ | 1.492 | $\nu_6$ | 57.2 |
| $r_{11}$ | ∞ (mm) | | | | | | | |

Aspherical Coefficients:

| | $r_1$ | $r_9$ | $r_{10}$ |
|---|---|---|---|
| $a_1$ | $3.4273 \times 10^{-3}$ | $-5.1911 \times 10^{-4}$ | $-9.9394 \times 10^{-3}$ |
| $a_2$ | $-8.6020 \times 10^{-8}$ | $8.5020 \times 10^{-7}$ | $-2.3211 \times 10^{-6}$ |
| $a_3$ | $-1.6183 \times 10^{-11}$ | $1.0470 \times 10^{-11}$ | $4.9388 \times 10^{-10}$ |
| $a_4$ | $-9.0629 \times 10^{-16}$ | $7.0244 \times 10^{-14}$ | $-3.4879 \times 10^{-13}$ |
| $a_5$ | $-1.4306 \times 10^{-19}$ | $-1.3909 \times 10^{-17}$ | $-1.1994 \times 10^{-16}$ | where $r_1$–$r_{11}$ is the paraxial radius (mm) of curvature of the lens surface starting with the lens surface nearest the screen, $d_1$–$d_{10}$ is the axial distance (mm) between the lens surfaces starting with the lens surface nearest the screen, $n_1$–$n_6$ is the refractive index of the respective lenses starting from the lens nearest the screen, and $\nu_1$–$\nu_6$ is the Abbe-number of the respective lenses starting with the lens nearest the screen.

* * * * *